United States Patent [19]

Brenik et al.

[11] 4,397,158

[45] Aug. 9, 1983

[54] APPARATUS FOR TREATING MATERIALS IN THE FORM OF CONTINUOUS LENGTHS

[75] Inventors: Wenzel Brenik, Grünwald; Dieter Riedel, Porta Westfalica-Hausberge, both of Fed. Rep. of Germany

[73] Assignee: Drabert Söhne, Minden, Fed. Rep. of Germany

[21] Appl. No.: 298,306

[22] Filed: Sep. 1, 1981

[30] Foreign Application Priority Data

Apr. 23, 1980 [DE] Fed. Rep. of Germany ....... 3015672

[51] Int. Cl.³ .............................................. F25D 25/04
[52] U.S. Cl. .......................................... 62/380; 62/63
[58] Field of Search ...................... 62/63, 64, 374, 380

[56] References Cited

U.S. PATENT DOCUMENTS 2,365,352 12/1944 Moffitt ..................................... 62/63
3,864,931 2/1975 Guttinger ................................ 62/63
4,107,937 8/1978 Chmiel ..................................... 62/64

*Primary Examiner*—Ronald C. Capossela
*Attorney, Agent, or Firm*—Karl F. Ross; Herbert Dubno

[57] ABSTRACT

In a method of treating coated or uncoated materials made of natural or synthetic polymers in the form of continuous lengths to improve the quality of the material, the material is subjected to a series of processing steps, one of which is a cooling step in which the material is cooled by means of a cooling medium at extremely low temperature, such as a liquefied gas, for example, liquid nitrogen. Such cooling after a drying or heat-setting operation prevents creasing of the material when it is folded to form a stack. Apparatus for carrying out the method comprises a conveyor (2) for the length of material (1) and at least one blast nozzle head (3) provided with a plurality of blast nozzles (5) past which the material is conveyed, and connected to a source of cooling medium through suitable delivery means.

10 Claims, 3 Drawing Figures

APPARATUS FOR TREATING MATERIALS IN THE FORM OF CONTINUOUS LENGTHS

FIELD OF THE INVENTION

The present invention relates to an apparatus for treating coated or uncoated materials in the form of continuous lengths made of natural or synthetic polymers to improve their quality, wherein the materials are cooled inter alia in the course of several processing steps, optionally while the width of the material is controlled.

BACKGROUND OF THE INVENTION

Examples of suitable materials for the treatment with the apparatus of the invention include textiles, paper, leather, plastic films, wood, rubber, vulcanized fibers, emery cloth, and the like. As is well known, when producing lengths of such materials, it is often necessary to cool them in the course of various other processing operations, such as after a drying operation or a heat-setting operation, for example, so as to permit continuous further processing and to ensure that the material is of high quality.

For example, it is customary to dry or heat-set composite fabrics containing synthetic fibers at speeds of from 100 to 150 m/minute, the lengths of fabric emerging from the heating chamber at temperatures of between 75° C. and 110° C. at these speeds. If the lengths of material were to be folded and stored at such temperatures, the intrinsic weight of the stack could produce creases and kinks which would impair the quality of the material if it was piled unsuitably. However, such creasing can usually be avoided if the lengths of material are cooled down at least to room temperature, before being folded. Apart from this, the quality of the lengths of material can be improved by cooling if, during such heat-treatment operations, the length of material are kept taut widthwise (in the direction of their width) by means of spiked chains, clamps, or the like, so as to maintain dimensional stability; this dimensional stability can be much better maintained after a heat treatment, if the lengths of material are cooled immediately after the heat-treatment, possibly also while the width of the material is controlled.

Hitherto, in most cases, the lengths of material have been cooled by blowing fresh air over them. In addition, particularly when permeable materials are involved, arrangements have been used in which fresh air is drawn through the length of material by means of a vacuum with the aid of suction nozzle heads past which the length of material is led, or with the aid of perforated drums over which the length of material is passed. However, with these cooling systems, large quantities of air have to be pumped to obtain a satisfactory cooling effect given the short cooling time available with the high speeds used during the processing operations. This leads to high energy costs which are quite unjustifiable economically in many cases. Consequently, use has already been made of cooling systems in which the air is cooled in heat exchangers, for example, by means of cooling water, and only then brought into contact with the length of material. But, even with such cooling systems, substantial amounts of energy often have to be used in order to obtain a cooling speed corresponding to the speed of the individual processing operations.

OBJECTS OF THE INVENTION

It is an object of the present invention to provide an apparatus for treating materials in the form of continuous lengths made of natural or synthetic polymers.

Another object is to provide an apparatus by means of which intensive cooling of lengths of material can be achieved in a simple fashion, and with which the cooling process can readily be matched to the speed at which individual processing operations take place.

SUMMARY OF THE INVENTION

According to one aspect of the invention, there is provided a method of treating coated or uncoated materials made of natural or synthetic polymers to improve the quality thereof, in which the material in the form of a continuous length is subjected to a plurality of successive processing steps including a cooling step in which the material is cooled by means of a cooling medium at extremely low temperatures. Preferably, the cooling medium is a liquefied gas.

The use of a very cold cooling medium (i.e. a temperature considerably below normal atmospheric temperature) makes it possible to ensure a very rapid and intensive cooling of the material in a continuous process in which as the lengths of material undergo a series of processing steps. During cooling, the lengths of material can be held taut widthwise by suitable means, such as spiked chains or clamps, so that dimensional stability can also be maintained during the cooling process; this dimensional stability will then stay constant after the cooling step.

Liquid nitrogen is a particularly suitable and advantageous cooling medium of extremely low temperature. It can be brought into heat exchange with the length of material to be cooled at a temperature of −196° C. and vaporizes in the process. The cold gas so produced can be directed against the length of material being cooled so as to remove a considerable amount of heat from the length of material in this way before the actual shock-cooling with the liquefied gas.

Apart from spraying the cooling medium directly onto the material to be cooled, it is also possible to mix the cooling medium with a gas, such as air, for example, and to bring this mixture into contact with the length of material. Which of the cooling methods is used depends primarily on the preceding process steps which the length of material has undergone and the temperatures thereof.

It is particularly advantageous to cool the lengths of material in this way using a cooling medium at extremely low temperature after the materials have undergone a heat-treatment and/or humidifying process. After heat-treatment, needed, for example, to dry the length of material, this at once ensures intensive cooling of the length of material so that this can undergo further processing without the risk of creasing and varying dimensional stability which is particularly high when the material is hot. After a length of material has been humidified, an operation which is particularly necessary for woven and knitted fabrics to prevent them from drying out, this kind of cooling makes it possible to conserve the moisture introduced in the core of the fibers by freezing. As a result of the presence of a frozen film of water on the surface of the fabric, virtually none of the moisture is lost through evaporation when the fabric is folded to form a stack and the moisture initially present in the form of a surface film penetrates into the centers of the fibers more easily as the fabric is defrosted.

In accordance with a further aspect of the invention, apparatus for carrying out the method comprises a conveyor, on which the materials are placed, if desired, fixed as regards their width, and a cooling system, which comprises at least one blast nozzle head, provided at one side with a plurality of blast nozzles, past which the conveyor moves, the or each blast nozzle head being connected to a source of a cooling medium at extremely low temperatures through a feeding means and a piping system.

The conveyor may be in the form of an endless belt which may be perforated, if required. Alternatively, the conveyor could merely be in the form of a pair of spiked chains or clamps laterally separated by a distance equal to the width of the material and by which the length of material is secured, so that it can be moved past the blast nozzle heads unsupported and the cooling medium can be brought into contact with the length of material without interference by a conveyor belt.

Preferably, the blast nozzles and the delivery arrangement are so designed that the cooling medium leaves the outlet of the nozzle at a speed of 20 to 60 m/sec., in particular 30 to 50 m/sec. If such a flow rate for the cooling medium is maintained at the outlet of the blast nozzle, uniform and intensive cooling of the length of material is ensured at the conveying speeds normally used for all the process steps.

The cooling system comprising the blast nozzle heads is preferably so constructed that all the blast nozzle heads have at least one associated extractor head, connected to the feeding means and located opposite to the side of the blast nozzle head provided with the nozzles. The conveyor feeds the length of material between the blast nozzle heads and the extractor heads, so that the cooling medium coming from the blast nozzle heads can be sucked away by means of the extractor heads after cooling the length of material, and then returned to the feeding means. In this way, the cryogenic energy still present in the cooling medium after cooling the length of material can be re-used to cool a length of material and the cooling medium circuit formed by the extractor heads and the return line to the feeding means only has to be supplied with sufficient fresh cooling medium from the cooling medium source to offset the cryogenic energy lost in heat exchange with the length of material. Excess cooling medium is sucked up through the gap provided between the blast nozzle heads and the extractor heads for the passage of the conveyor and the length of material. The blast nozzle heads and the extractor heads can be arranged so that each blast nozzle head has its own extractor head located opposite to it, or so that a single extractor head is located opposite to a plurality of blast nozzle heads mounted side by side.

Instead of using extractor heads, in an alternative embodiment of the invention, pairs of blast nozzle heads are arranged in the cooling system with their nozzle sides facing one another, the conveyor carrying the length of material being passed between the facing sides of the blast nozzle heads. Compared with the first embodiment described above, this cooling arrangement has the advantage that the cooling medium can be directed onto the length of material both from above and below, thereby increasing the total cooling effect. One way of reutilizing the cooling medium in this form of apparatus is for the cooling arrangement to include a thermally insulated tunnel in which the blast nozzle heads are arranged. The cooling medium emerging through the gap between the facing blast nozzle heads can then be collected in the cooling tunnel, withdrawn therefrom and returned to the cooling medium feeding means. The cooling tunnel can also serve to provide thermal insulation for the cooling system as a whole. If no cooling tunnel is provided, it is always desirable for all the parts of the cooling system and feeding means to have thermally insulated walls.

For the distribution of the cooling medium to the individual blast nozzles in the blast nozzle heads, it is advantageous if the blast nozzle heads are provided with internal gas ducting walls. This is a simple way of ensuring uniform distribution of the cooling medium over the entire width of the length of material.

In order that, in certain cooling applications where the lengths of material require particularly intensive cooling, the cooling medium can be mixed with a convection carrier such as air for example, prior to directing it onto the length of material, it is expedient for the feeding means to include a mixing chamber and a compressor attached thereto, and for atomizer nozzles for the cooling medium to be arranged in the mixing chamber. The two media are then mixed together in the mixing chamber, the compressor supplying fresh and/or recirculated air from the cooling medium circuit to the mixing chamber. To ensure thorough mixing of the cooling medium and the convection carrier, the atomizer nozzles should be so directed that the cooling medium is sprayed against the direction of flow of the convection carrier. The mixing chamber can be located between the compressor and the blast nozzle head or in front of the compressor intake.

If air is used as the convection carrier, the relative humidity of the air rises as the temperature falls due to the introduction of the cooling medium, until excess water vapor is precipitated in droplet form when the dewpoint has been passed. Since humidification is undesirable with many materials, such as paper, for example, it is thus advantageous, when handling such materials, to locate at least one vapor trap in the mixing chamber downstream of the atomizer nozzles in the direction of flow and to separate the water vapor that forms by this means.

To allow processing to take place continuously after the length of material has undergone a heat-treatment operation, it is advantageous, for the cooling arrangement to be located at the end of a horizontal and/or multi-stage drying installation and/or a heat-setting installation, at which the length of material is discharged. In this way, the arrangement can be attached to existing drying and/or heat-setting installations without changing the overall size, since when an extremely cold cooling medium is used in accordance with the invention, satisfactory cooling of the length of material to be processed can be achieved with a cooling system which is very short, viewed in the operational flow direction. For example, an active cooling path about 1 m in length is sufficient to cool a length of material emerging from the drying or heat-setting installation at a speed of 150 m/min., at a temperature of 70° C., down to a temperature of 20° C. This sort of space is available behind any horizontal drying installation, so the conveying means of this installation can also be used to carry the length of material through the cooling system and the length of material, controlled as regards its width in the same way as for its passage through the horizontal drying installation, can be cooled down to room temperature and fixed. In this case, it is expedient to measure continuously the temperature of the material at the outlet of the installation and to regulate the amount of extremely cold cooling medium delivered so as to obtain a given temperature level for a particular material, thereby obtaining an automatic control by which any unnecessary over-cooling of the length of material is avoided.

BRIEF DESCRIPTION OF THE DRAWING

The invention will now be further described with reference to the drawings, in which.

SPECIFIC DESCRIPTION

Figure 1:
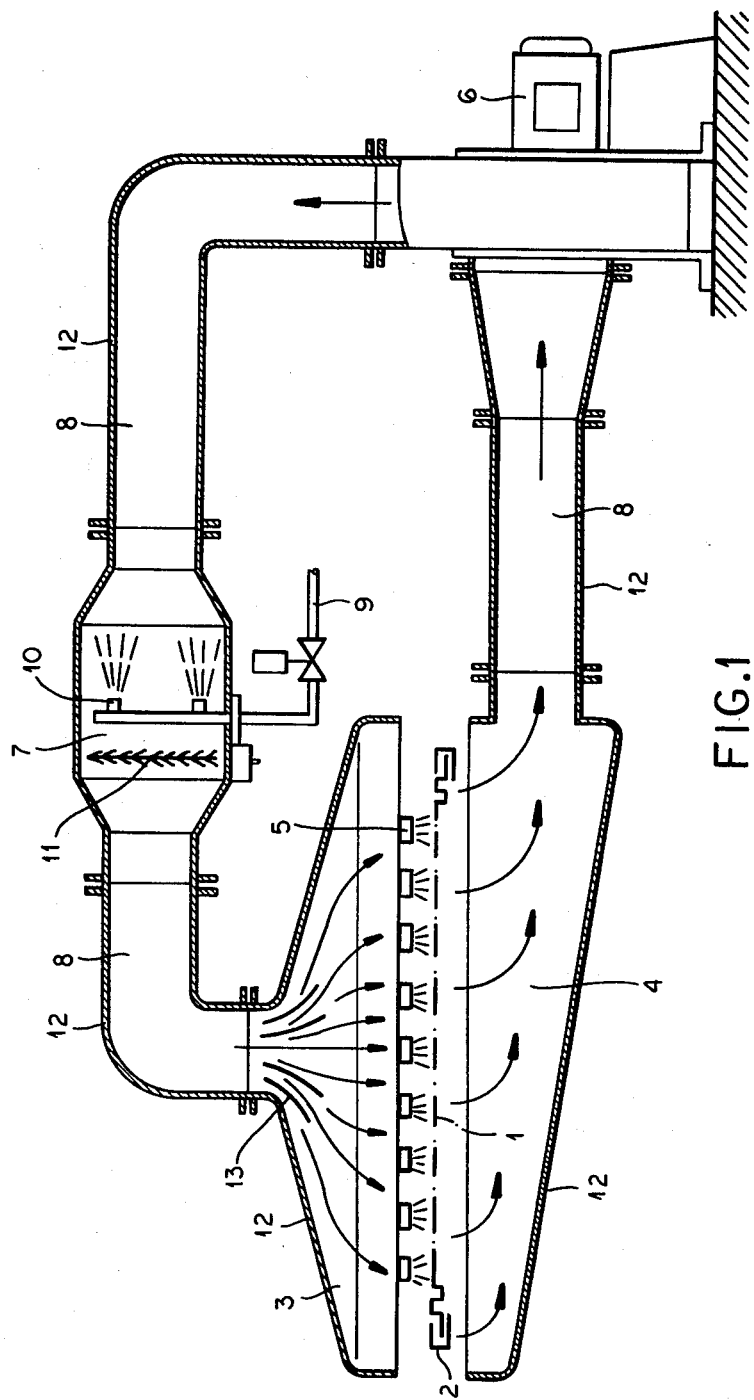
FIG. 1 is a schematic side-sectional view of a first form of apparatus according to the invention.

In all the Figures, a length of material 1 which is to be cooled is moved on a conveyor 2 through a cooling arrangement including one or more blast nozzle heads 3. The conveyor 2 may be in the form of two chains having spikes or clamps running along them and laterally separated by a space corresponding to the width of the length of material. Referring now to FIG. 1, the cooling arrangement comprises a blast nozzle head 3 having a plurality of blast nozzles 5 and an extractor head 4 located opposite the blast nozzle head 3 the conveyor 2 and the material to be cooled passing between the two heads 3 and 4, and means for delivering cooling medium at an extremely low temperatures, such as liquid nitrogen, for example, to the blast nozzle head 3. The delivery means comprises a compressor 6, a mixing chamber 7 and a piping system 8 connecting the output of the compressor 6 via the mixing chamber 7 to the blast nozzle head 3 and connecting the extractor head 4 to the intake of the compressor 6. A delivery pipe 9, which is connected to a source of cooling medium (not shown) and carries a plurality of atomizer nozzles 10 within the mixing chamber 7, is fixed to the mixing chamber 7. The piping system 8, the blast nozzle head 3 and the extractor head 4 are all provided with a thermally insulating covering 12.

The cooling medium delivered through the feed pipe 9 is mixed with the fresh or recirculated air delivered by the compressor 6 into the mixing chamber 7. For this purpose, the extremely cold cooling-medium present in the form of a liquefied gas, is sprayed preferably against the stream of air by means of the atomizer nozzles 10, so as to ensure thorough mixing of the air and the liquid cooling medium. In condensate forming as the air is cooled is filtered out by means of a vapor trap 11 disposed downstream of the atomizer nozzles 10 in the direction of air flow. The mixture of fresh air and extremely cold gas so formed is then distributed evenly over the length of material 1 through the blast nozzles 5 of the blast nozzle head 3 and, after heat exchange with the material 1, some of it is returned to the compressor 6 through the extractor head 4. Only a very small portion is lost through the gap provided between the blast nozzle head 3 and the extractor head 4 for the passage of the conveyor 2. To ensure uniform distribution of the cooling medium over the length of material 1, the blast nozzles 5 preferably take the form of nozzles with a hole or slit and the blast nozzle head 3 contains gas ducting walls 13 which distribute the cooling medium evenly to all the blast nozzles 5.

The apparatus shown in FIG. 2 differs from that shown in FIG. 1 in that the extractor head 4 is replaced by a further blast nozzle head 3 so that in this case the length of material 1 being cooled is brought into contact with a cooling medium both from above and from below. In this case, both the blast nozzle heads 3 are connected to the mixing chamber 7 via the piping system 8 and the compressor 6 only supplies fresh air to the mixing chamber 7.

Figure 2:
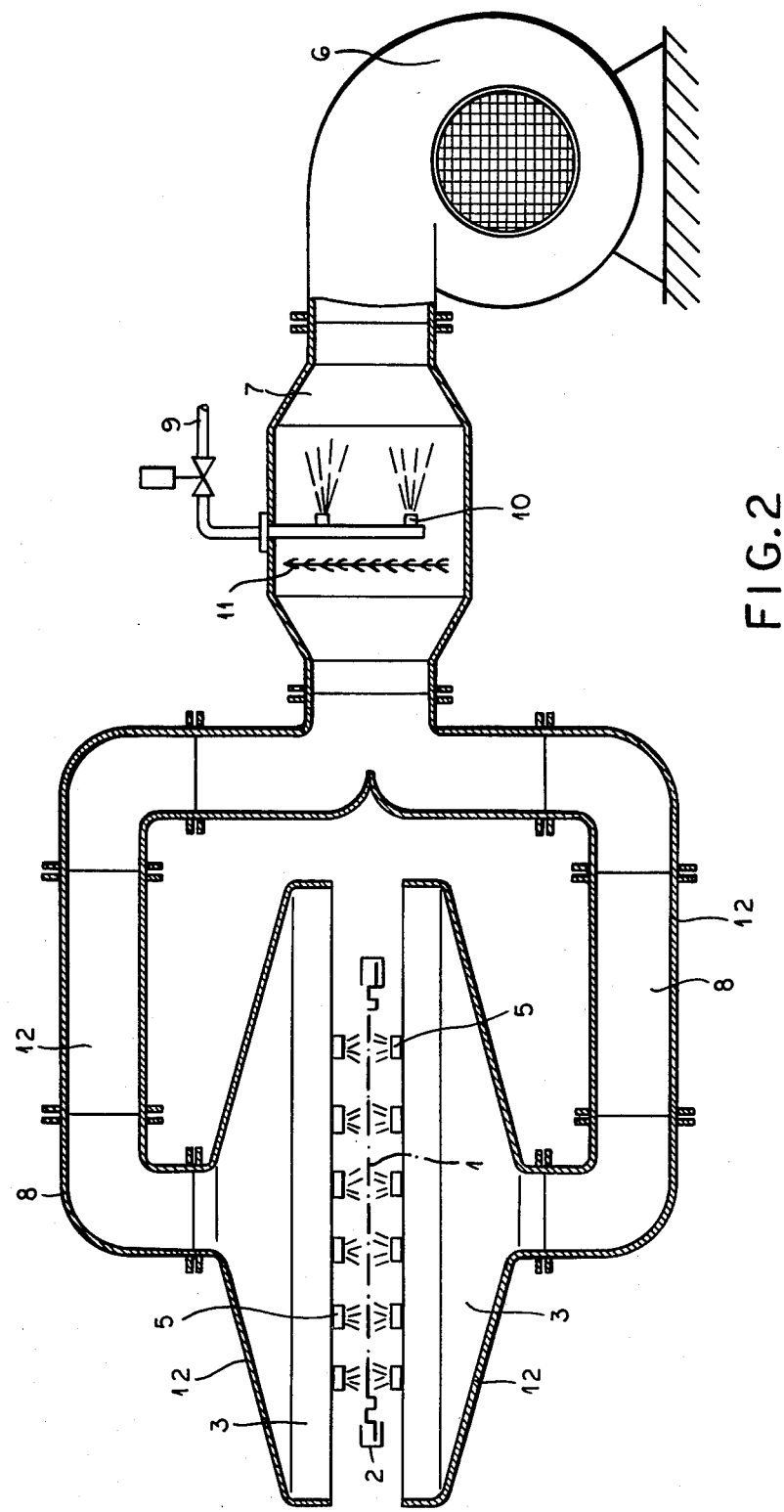
FIG. 2 is a view, similar to that of FIG. 1, of a further form of apparatus according to the invention.
Figure 3:
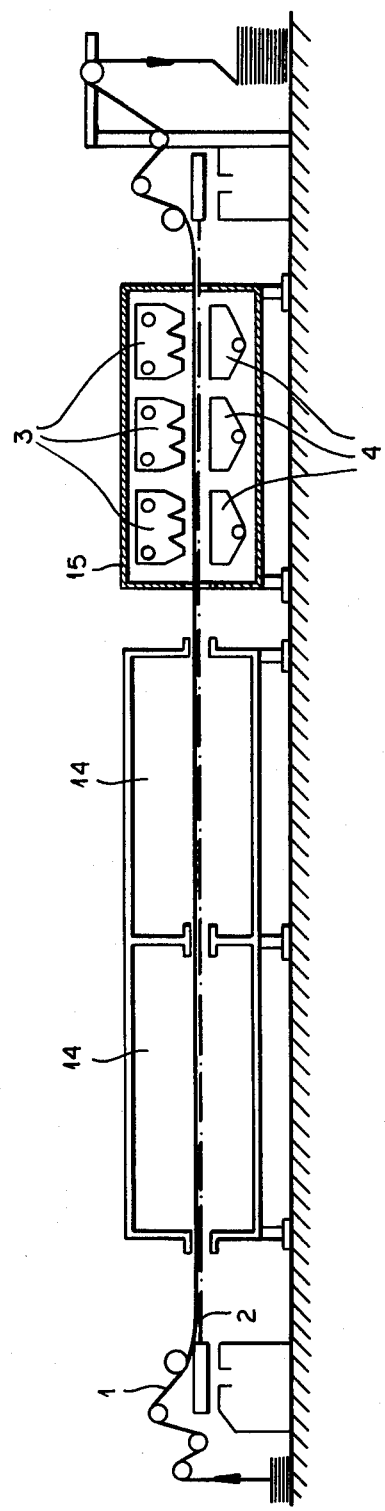
FIG. 3 is a schematic side-sectional view of a treatment installation for a continuous length of material including apparatus according to the invention.

In the treatment installation shown in FIG. 3, the cooling apparatus in accordance with the invention is located at the material discharge end of a horizontal drying and/or heat-setting plant 14, the conveyor 2 and the cooling arrangement being shown from the side in contrast to the view of FIGS. 1 and 2, where it is shown in transverse section. In this case, the cooling system consists of three blast nozzle heads 3 which are connected one behind another and located in a thermally insulated and almost completely closed cooling tunnel 15. The blast nozzle heads 3 located above the conveyor 2 can have either extractor heads 4 or further blast nozzle heads 3 located opposite them on the underside of the conveyor 2, as in the arrangements shown in FIGS. 1 and 2 respectively. In the latter case, the cooling tunnel 15 may be provided with a gas discharge line which is connected to the intake side of a compressor connected to the blast nozzle heads 3.

The enlarged cooling area produced by connecting a plurality of blast nozzle heads one behind another allows increased cooling of the length of material as compared with arrangements using a single blast nozzle head 3 so that the intensity of the cooling effect can be tailored in accordance with the preceding processing operation which the length of material has undergone, by selection of the number of blast nozzle heads used, and by the choice of a cooling system with blast nozzle heads and extractor heads, or with blast nozzle heads alone.

Apart from using a mixing chamber to mix the extremely cold gas which is used as the cooling medium with the convection carrier e.g. air, it is also possible to spray the extremely cold gas used as the cooling medium directly through the blast nozzle heads onto the material, giving yet another variation in the cooling intensity produced. In every case, the shape of the blast nozzles and the distance between the mouths of the nozzles and the length of material have a decisive influence on the outcome of the heat transfer process.

We claim:

1. An apparatus for treating coated or uncoated materials made of natural or synthetic polymers to improve the quality thereof in which a web of the material in the form of a continuous length is subjected to a plurality of successive processing steps including a cooling step in which the material is cooled by means of a liquefied gas forming a cooling medium at an extremely low temperature, said apparatus comprising:

means for conveying said web successively through a plurality of processing stations including a cooling station;

at least one blast nozzle head at said cooling station spanning the width of said web and opening toward said web at least on one side thereof, said blast nozzle head having a central inlet and walls diverging toward a wide outlet side confronting said web, said walls defining a chamber diverging toward said web;

a plurality of blast nozzles spaced across said web in said blast nozzle head and spanning a mouth of said chamber and trained upon said web for directing said cooling medium thereagainst as said web passes said head, said cooling medium being distributed to said nozzles by said chamber;

a source of said cooling medium connected to said head for delivering said medium to said chamber and said nozzles, said source having a suction side; and an extractor head juxtaposed with the opposite side of said web, the said cooling station for drawing cooling medium traversing said web away from the latter, said extractor head being connected to said suction side of said source.

2. The apparatus defined in claim 1 wherein said nozzles and said head are constructed and connected to said source such that said cooling medium is discharged from said nozzles toward said web at a velocity of 20 to 60 meters per second.

3. The apparatus defined in claim 2 wherein said velocity is 30 to 50 meters per second.

4. The apparatus defined in claim 1 wherein said cooling station is located in a cooling tunnel having thermally insulated walls.

5. The apparatus defined in claim 1, further comprising insulation lining all passages for said cooling medium between said source and said nozzles.

6. The apparatus defined in claim 1 wherein said head is formed with internal gas ducting walls.

7. The apparatus defined in claim 1 wherein said source includes a mixing chamber and a compressor connected to said mixing chamber for feeding a gas under pressure thereto, atomizer means for dispersing a liquefied gas coolant into said mixing chamber to form said cooling medium therein and duct means connecting said head with said mixing chamber.

8. The apparatus defined in claim 7, further comprising a vapor trap in said mixing chamber downstream of the atomizer means whereby the condensate is removed from said cooling medium.

9. The apparatus defined in claim 1 wherein said cooling station is disposed at the discharge end of a drying installation for said material.

10. The apparatus defined in claim 1 wherein said cooling station is located at the discharge end of a heat-setting installation for said material.

* * * * *